United States Patent
Föhl

[11] Patent Number: 5,310,219
[45] Date of Patent: May 10, 1994

[54] SAFETY BELT PRETENSIONER HAVING A PYROTECHNICAL PISTON/CYLINDER DRIVE

[75] Inventor: Arthur Föhl, Schorndorf, Fed. Rep. of Germany

[73] Assignee: TRW Repa GmbH, Alfdorf, Fed. Rep. of Germany

[21] Appl. No.: 2,928

[22] Filed: Jan. 11, 1993

[30] Foreign Application Priority Data

Jan. 20, 1992 [DE] Fed. Rep. of Germany ....... 4201359

[51] Int. Cl.⁵ ................................................ B60R 22/46
[52] U.S. Cl. .................................... 280/806; 297/480
[58] Field of Search ................... 280/806; 297/480; 60/632, 635, 636, 637, 638; 188/371, 374, 376, 377; 200/61.48

[56] References Cited

U.S. PATENT DOCUMENTS

| | | | |
|---|---|---|---|
| 3,917,031 | 11/1975 | Doin et al. | 280/806 |
| 3,982,775 | 9/1976 | Lindblad | 297/480 |
| 4,258,934 | 3/1981 | Tsuge et al. | 280/806 |
| 4,288,098 | 9/1981 | Tsuge et al. | 297/480 |
| 4,458,921 | 7/1984 | Chiba et al. | 280/806 |
| 4,767,161 | 8/1988 | Sedlmayr et al. | 297/472 |
| 5,037,134 | 8/1991 | Tabata | 280/806 |
| 5,104,193 | 4/1992 | Föhl | 280/806 |

FOREIGN PATENT DOCUMENTS

| | | |
|---|---|---|
| 0186880 | 7/1986 | European Pat. Off. |
| 528064 | 2/1993 | European Pat. Off. ............ 280/806 |
| 2349891 | 4/1975 | Fed. Rep. of Germany ...... 280/805 |
| 2411702 | 9/1975 | Fed. Rep. of Germany ...... 280/805 |

OTHER PUBLICATIONS

European Search Report EP 93100494.9.

Primary Examiner—Karin L. Tyson
Attorney, Agent, or Firm—Tarolli, Sundheim & Covell

[57] ABSTRACT

A belt pretensioner comprising a pyrotechnical piston/-cylinder drive has a vehicle-sensitive mass which is formed by a pivotally mounted base (14), a gas generator (18) inserted therein and a piston/cylinder unit (20). To ensure free pivotability of the base (14), the piston (24) is accommodated in the cylinder (22) with axial and radial clearance. The piston (24) is provided with an annular groove (50) in which an annular seal (52) is arranged. When not subjected to the gas pressure from the gas generator, the annular seal (52) is not in contact with the inner wall of the cylinder (22). Under the gas action the annular seal (52) is moved axially along the conically rising bottom (56) of the annular groove (50) and at the same time radially expanded until it comes into sealing engagement with the inner wall of the cylinder (22).

12 Claims, 2 Drawing Sheets

SAFETY BELT PRETENSIONER HAVING A PYROTECHNICAL PISTON/CYLINDER DRIVE

BACKGROUND OF THE INVENTION

The present invention relates to a safety belt pretensioner having a pyrotechnical piston/cylinder drive in which the cylinder and piston as well as a base block in which one end of the cylinder is secured from a pivotally mounted vehicle-sensitive mass and a cable secured to the piston is led out of the base block.

FIELD OF THE INVENTION

The vehicle-sensitive pivoting of the base block is restricted to a certain extent by the cable led out of said block and secured to the piston because said cable, which for example leads to the periphery of a pulley on one side of a belt retractor, cannot follow the movement of the base block and a relative movement occurs between cable and base block. To ensure a sensitive vehicle-dependent response, obstruction of the pivoting of the base block by the pulling cable should be avoided. Attempts have already been made to do this by permitting a limited axial displacement of the cable in a bore of the piston. The improvement thus achieved was however not satisfactory because due its surface structure the cable tends to catch on the inner wall of the bore of the piston.

SUMMARY OF THE INVENTION

The invention provides a safety belt pretensioner wherein the base block is free to pivot without obstruction by the cable.

This is achieved according to the invention in a safety belt pretensioner of the type set forth above in that the piston is accommodated in the cylinder with an axial and radial clearance such that one vehicle-sensitive pivoting of the base block it is displaced axially in the cylinder and thus does not obstruct the pivoting of the housing block. The piston is provided with a deformable annular seal which until the piston is subjected to pressurized gas from the gas generator is arranged at the conical bottom of an annular groove of the piston without contacting the inner wall of the cylinder and under the action of pressurized gas is displaced along the conical bottom of the annular groove and at the same time by the rise of the conical bottom of the annular groove is urged radially outwardly into sealing engagement with the inner wall of the cylinder. Thus, according to the invention in the rest state a radial and axial clearance of the piston is allowed in the cylinder so that the latter can move freely with the cable. On pivoting of the base block an axial displacement of the piston and the cable secured thereto therefore takes place. When the piston is subjected to the action of pressurized gases furnished by the pyrotechnical gas generator, however, a sealing must be ensured between the piston and cylinder inner wall. This is ensured according to the invention in that the annular seal is urged by the action of the pressure in the axial direction along the conical bottom of the annular groove and at the same time is radially expanded by the ramp effect until it comes into contact with the inner wall of the cylinder and seals the piston in the cylinder.

BRIEF DESCRIPTION OF THE DRAWINGS

Further features and advantages of the invention will be apparent from the subsidiary claims and from the following description of an advantageous embodiment with the aid of the drawings, to which reference is made and in which:

DESCRIPTION OF THE PREFERRED EMBODIMENTS

Figure 2:
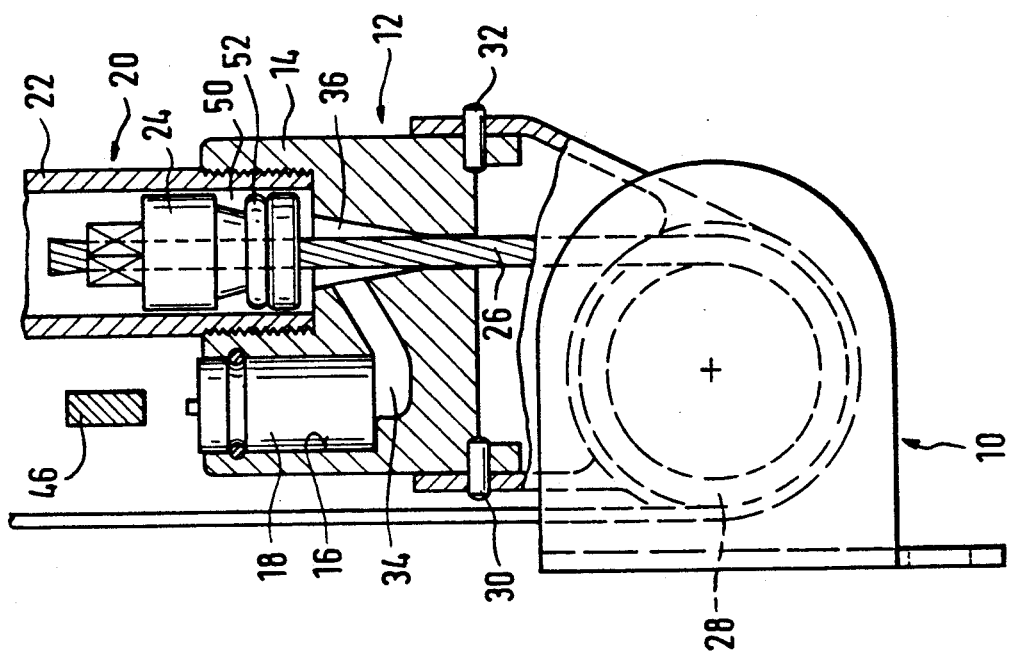
FIG. 2 is a partially sectioned side elevation of the same belt retractor having a belt pretensioner.
Figure 1:
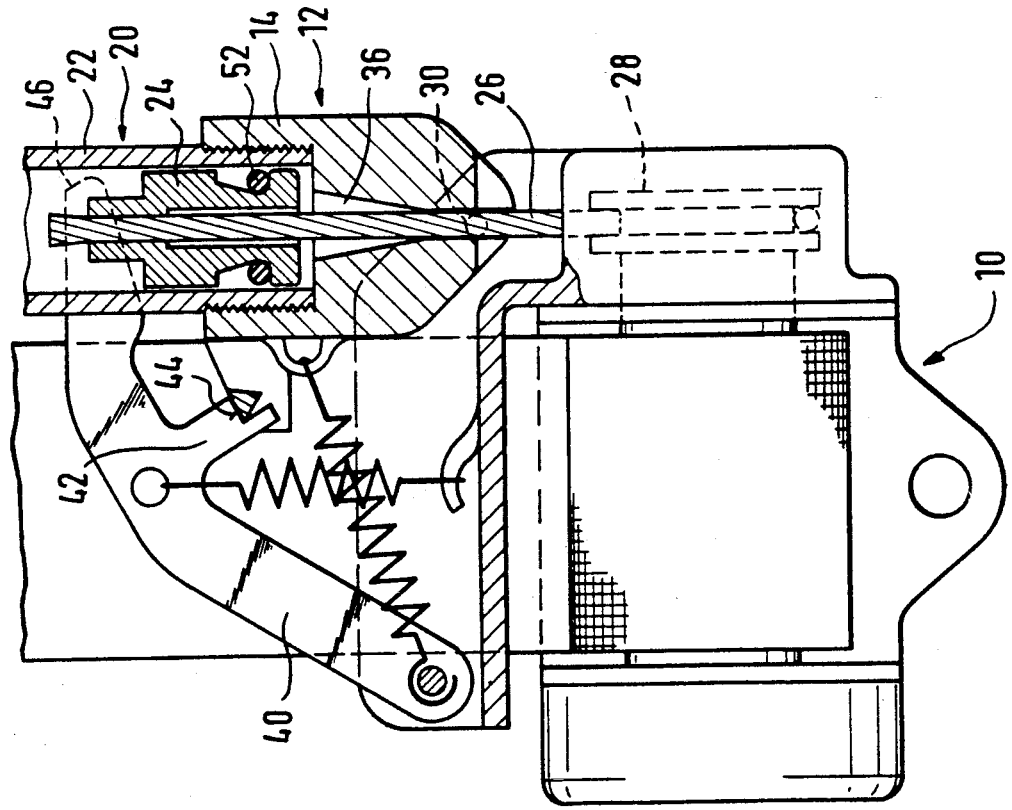
FIG. 1 shows a partially sectioned plan view of a belt retractor having a pyrotechnical belt pretensioner.

The belt retractor designated in FIGS. 1 and 2 generally by 10 is combined with a belt pretensioner designated generally by 12 to form an assembly. The belt pretensioner 12 has a pyrotechnical piston/cylinder drive with mechanical triggering by percussion firing. The vehicle-sensitive inertial mass is formed by a base block 14, the gas generator 18 inserted into a bore 16 thereof and by the piston/cylinder drive denoted generally by 20. The cylinder 22 is screwed with its one end into a threaded bore of the base block 14. The piston 24 accommodated in the cylinder 22 is connected to a pulling cable 26 which is led out of the base block 14 and to the periphery of a pulley 28 at the side of the belt retractor 10. The base block 14 is pivotally mounted on two pivot pins 30, 32 on the loadbearing frame of the belt retractor 10. These pivot bearings lie at the level of the exit of the pulling cable 26 out of the base block 14 so that on pivoting of the base block 14 relatively to the loadbearing frame of the belt retractor 10 the relative movements of the pulling cable 26 are minimized. The outlet opening of the gas generator 18 opens into a passage 34 which in turn opens into a space 36 beneath the piston 24.

In the rest state, i.e. when no pressurized gases from the gas generator 18 are acting, the piston 24 is accommodated in the cylinder 22 with slight axial and radial clearance so that it is easily displaceable in the cylinder 22. On vehicle-sensitive pivoting of the base block 14 there is thus no obstruction by relative displacement of the pulling cable 26 with respect to the base block 14.

As apparent from FIG. 1, a spring-loaded strike lever 40 is pivotally mounted on the loadbearing frame of the belt retractor 10. The strike lever 40 bears with one arm 42 on a support surface 44 of the base block 14 so that a strike member 46 formed at the free end thereof lies opposite and spaced from the end of the gas generator 18 provided with a percussion igniter, as can be seen in FIG. 2. on vehicle-sensitive pivoting of the base block 14 the support surface at the end of the arm 42 of the strike lever 40 slides over the support surface 44 of the base block 14 until the edge of said support surface 44 is reached and the strike lever 40 is suddenly released. The strike member 46 at the end of the strike lever 40 is then driven by the spring-loading thereof against the percussion igniter of the gas generator 18 and triggers the latter. The pressurized gases then generated by the gas generator 18 are introduced via the connecting passage 34 into the space 36 beneath the piston 24.

Figure 3:
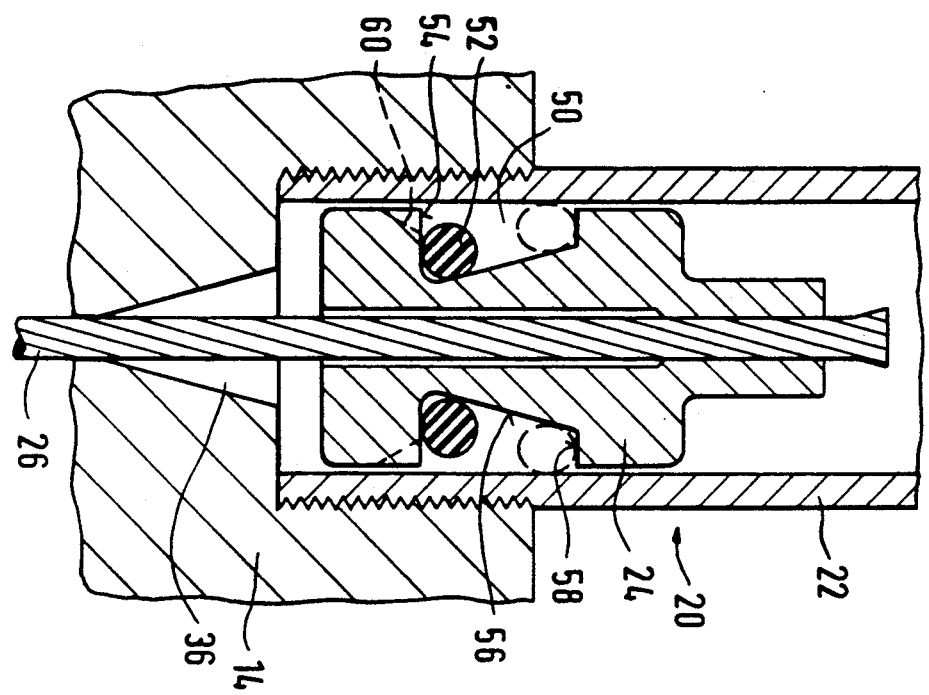
FIG. 3 is an enlarged partial section of a first embodiment of the piston/cylinder drive.
Figure 4:
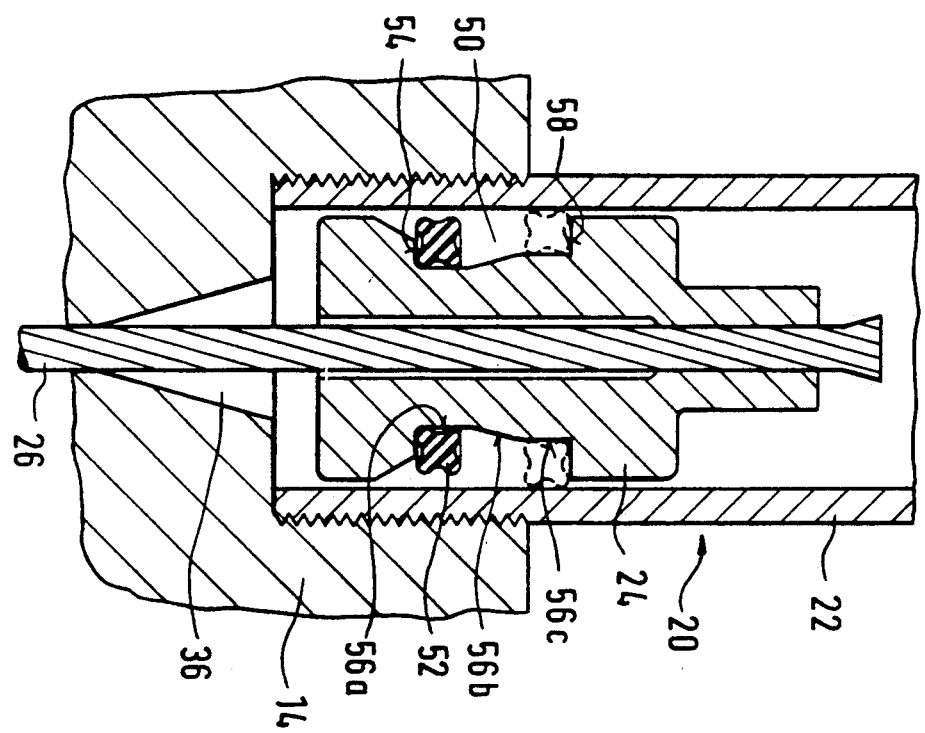
FIG. 4 is a side elevation of the second embodiment analogous to FIG. 3.

The piston 24 is provided with an annular groove 50, the shape and function of which will be apparent from FIGS. 3 and 4. An annular seal 52 is arranged in the annular groove 50 of the piston 24. The annular seal 52 bears on a radial shoulder 54 of the annular groove 50 and on the bottom 56 thereof. It consists of a rubber elastic material. The bottom 56 of the annular groove 50 is made conical and forms a rising ramp which extends up to a radial annular shoulder 58 of the annular groove 50. As is apparent from the drawings, the piston 24 is accommodated with axial and radial play in the cylinder 22. In the rest condition shown in full lines the annular seal 52 is not in contact with the inner wall of the cylinder 22.

When the piston 24 is subjected to pressure the annular seal 52 is driven along the conical bottom 56 of the annular groove 50 in the axial direction and at the same time expanded in radial direction. The axial movement of the annular seal 52 is limited by the radial shoulder 58 of the annular groove 50 whilst its radial expansion is limited by the sealing engagement with the inner wall of the cylinder 22. FIG. 3 shows in dashed line the state of the annular seal 52 after it has been displaced up to the radial shoulder 58. In this state the piston 54 is sealed in the cylinder 22.

According to an advantageous embodiment which is shown in dashed line in FIG. 3 the annular shoulder 54 of the annular groove 50 merges via an inclined surface 60 into the outer surface of the piston 24. This inclined surface 60 exposes part of the end face of the annular seal 52 so that at the start of the pressure action a large radial area component of the annular seal 52 is effective for the pressure action.

In the embodiment shown in FIG. 3 the annular seal 52 is of circular cross-section. In the embodiment according to FIG. 4 an annular seal 52 of so called "Quadring" cross-section is used. In this embodiment, the seal 52 is generally square in cross-section with concave faces, and the bottom 56 of the annular groove 50 consists of a first cylindrical portion 56a, a second conical portion 56b adjoining the latter and a third cylindrical portion 56c. The mode of operation is similar to that of the embodiment shown in FIG. 3.

What is claimed is:

1. A safety belt pretensioner having a frame and a pyrotechnical piston/cylinder drive which comprises a cylinder, a piston accommodated in said cylinder, a gas generator and a base pivotally mounted on said frame, said cylinder, piston and base forming a vehicle-sensitive inertial mass and a cable being connected to said piston and extending out of said base, wherein said piston is received in said cylinder with radial clearance and wherein said piston has an annular groove around its periphery and said groove has a bottom shaped to act as a ramp extending between a first bottom end of smaller diameter and a second bottom end of larger diameter, a deformable annular seal being located in said groove adjacent said first bottom end without contacting said cylinder, and said annular seal being adapted to move along said groove bottom towards said second bottom end and radially outwardly into contact with said cylinder under the action of pressurized gas supplied by said gas generator.

2. The safety belt pretensioner, according to claim 1, wherein said frame is formed by a loadbearing housing of a belt retractor which forms an assembly with said belt pretensioner.

3. The safety belt pretensioner, according to claim 1, wherein said gas generator comprises a percussion igniter inserted into a bore of the base and a spring-loaded strike lever is supported on said base in such a manner that its free end forming a strike member is held spaced from said percussion igniter but on adequate pivoting of said base is freed and strikes said percussion igniter.

4. The safety belt pretensioner according to claim 1, wherein said base has an outlet opening for said cable and said outlet opening lies in a common plane with the pivotal axis of said base.

5. The safety belt pretensioner according to claim 1, wherein said annular groove on the side of said first bottom end adjoins an inclined annular surface which originates from the outer surface of the piston and which exposes part of the surface of said annular seal to gas supplied by said gas generator.

6. The safety belt pretensioner according to claim 5, wherein said inclined annular surface is adjoined by a radial annular shoulder on which said annular seal bears until subjected to the gas.

7. The safety belt pretensioner according to claim 1, wherein said bottom of the annular groove is defined by a pair of radial annular shoulders which limit axial movement of said annular seal.

8. The safety belt pretensioner according to claim 7, wherein said annular seal has a circular cross-section.

9. The safety belt pretensioner according to claim 1, wherein said conical bottom of the annular groove is located between a pair of annular surfaces of cylindrical shape which are in turn defined by a pair of radial annular surfaces each forming an abutment for said annular seal.

10. The safety belt pretensioner according to claim 9, wherein said annular seal has a generally square cross-section with concave faces.

11. A safety belt pretensioner for a vehicle comprising:
    a frame;
    a gas generator;
    a base pivotally connected to said frame, said base being pivotal relative to said frame in response to deceleration of the vehicle at a rate above a predetermined rate;
    a cylinder connected to said base for receiving gas from said gas generator;
    a piston located within said cylinder and connectable with a seat belt retractor, said piston being radially spaced from said cylinder and including an annular groove;
    a deformable annular seal located in said annular groove in said piston, said deformable annular seal having a first position in which said deformable annular seal is radially spaced from said cylinder and a second position in which said deformable annular seal engages said cylinder; and
    means for moving said seal from its first position to its second position in response to said gas generator producing gas.

12. A safety belt pretensioner as set forth in claim 11 wherein said means for moving said deformable annular seal from its first position to its second position comprises a ramp engaging said annular seal and defining a surface of said annular groove in said piston, said ramp having a first axial end spaced from said cylinder a first distance and a second axial end spaced from said cylinder a second distance smaller than the first distance, said seal being movable along said ramp from said first axial end to said second axial end to move said seal into engagement with said cylinder.

* * * * *